US008865290B2

(12) United States Patent
Gosis et al.

(10) Patent No.: US 8,865,290 B2
(45) Date of Patent: Oct. 21, 2014

(54) FASTENING CLIP ASSEMBLY

(75) Inventors: Anatoly Gosis, Palatine, IL (US); Yury Shkolnikov, Glenview, IL (US); James T. Kirchen, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 705 days.

(21) Appl. No.: 13/144,075

(22) PCT Filed: Jan. 8, 2010

(86) PCT No.: PCT/US2010/020414
§ 371 (c)(1),
(2), (4) Date: Jul. 11, 2011

(87) PCT Pub. No.: WO2010/080942
PCT Pub. Date: Jul. 15, 2010

(65) Prior Publication Data
US 2011/0268927 A1     Nov. 3, 2011

Related U.S. Application Data

(60) Provisional application No. 61/143,864, filed on Jan. 12, 2009.

(51) Int. Cl.
| | | |
|---|---|---|
| *B32B 3/00* | (2006.01) |
| *B60J 5/00* | (2006.01) |
| *A44B 19/00* | (2006.01) |
| *F16B 21/08* | (2006.01) |
| *B60R 13/02* | (2006.01) |
| *F16B 2/14* | (2006.01) |
| *F16B 21/07* | (2006.01) |
| *F16B 5/06* | (2006.01) |

(52) U.S. Cl.
CPC .......... *F16B 21/088* (2013.01); *B60R 13/0206* (2013.01); *F16B 2/14* (2013.01); *F16B 21/075* (2013.01); *F16B 5/0657* (2013.01)
USPC .......... 428/172; 428/119; 296/146.7; 24/292; 24/297; 24/356; 24/458; 24/581.11

(58) Field of Classification Search
CPC ... B60R 13/0206; F16B 5/0664; F16B 21/06; F16B 21/088
USPC ............ 428/119, 120, 172; 296/146.7; 2/292, 2/297, 458, 581.11; 24/292, 297, 458, 24/581.11, 356
See application file for complete search history.

(56) References Cited

U.S. PATENT DOCUMENTS 2,028,528 A    1/1936   Sipe
4,122,583 A * 10/1978   Grittner et al. ............... 24/703.1
(Continued)

OTHER PUBLICATIONS

ISR for PCT/US2010/020414 dated Mar. 24, 2010.

*Primary Examiner* — Donald J Loney

(57) ABSTRACT

A fastening clip assembly configured to securely fasten to a mounting stud of a panel includes a main clip and a tapered member, such as a tapered locking pin. The main clip may include a central column defining a central passage. The central column may include a ledge. The tapered locking pin integrally connects to the central column through at least one flash joint integrally connected to the main clip proximate the ledge. The said tapered locking pin is configured to move into the central passage in order to securely fasten the assembly to the mounting stud.

20 Claims, 19 Drawing Sheets

(56) References Cited

U.S. PATENT DOCUMENTS

| | | | |
|---|---|---|---|
| 4,375,342 A * | 3/1983 | Wollar et al. | 411/41 |
| 4,488,843 A | 12/1984 | Achille | |
| 7,105,119 B2 * | 9/2006 | Kanie et al. | 264/238 |
| 2004/0120124 A1 | 6/2004 | Cauwels | |
| 2005/0220561 A1 * | 10/2005 | Okada | 411/41 |
| 2007/0186389 A1 | 8/2007 | Smith et al. | |

\* cited by examiner

FASTENING CLIP ASSEMBLY

RELATED APPLICATIONS

This application is national phase of PCT/US2010/020414 filed Jan. 8, 2010, and claims priority benefits from U.S. Provisional Patent Application No. 61/143,864 entitled "Plastic Fastening Clip," filed Jan. 12, 2009.

FIELD OF EMBODIMENTS OF THE INVENTION

Embodiments of the present invention generally relate to a fastening clip assembly, and more particularly, to a fastening clip assembly that may be used with respect to an interior plastic trim attachment of an automobile.

BACKGROUND

During the manufacturing process of an automobile, various components are secured to one another. For example, a door frame is secured to a main structure of the automobile. Often, components are secured within particular frames of the automobile.

For example, interior plastic trim attachments are used in various automobiles. Typically, trim attachments are secured to panels or the like through the use of metal clips that are frictionally pre-mounted to a molded trim. The clip and trim are then inserted into standardized apertures of a vehicle frame, panel or the like. After attachment, any attempt to remove the trim, either intentionally or inadvertently, causes the metal clip to dig into the trim, thereby providing a secure retaining connection.

Some manufacturers use plastic clips instead of metal clips. However, the plastic typically cannot dig into the plastic trim. Consequently, manufacturers provide a molded square opening on the trim, which is configured to interlock with the clip as a latch.

FIG. 1 illustrates an isometric view of a plastic clip 10 secured to a trim panel 12. The trim panel 12 includes a planar base 14 and a mounting stud 16 extending from the planar base 14. The clip 10 is mounted over a reception area of the mounting stud 16 and latchably secures thereto.

FIG. 2 illustrates a partial cross-sectional view of the plastic clip 10 secured to the mounting stud 16 of the trim panel 12. As shown in FIG. 2, the clip 10 latchably secures to the mounting stud 16. The clip 10 also includes ramped legs 18 that outwardly extend in order to receive and retain a component, such as an attachment, to be secured to the trim panel 12. For example, the attachment may include an opening that snapably secures about the ramped legs 18.

However, the mounting stud 16 generally requires side-action tooling in order to secure it in position. For example, as shown in FIG. 2, the mounting stud 16 includes a central rib 20 that includes a central opening 22 formed therethrough. The central opening 22 is configured to receive and retain latching members 24 of the clip 10. The side-action tooling used to secure the latching members 24 into the central opening 22 is relatively expensive.

SUMMARY OF EMBODIMENTS OF THE INVENTION

Certain embodiments of the present invention provide a fastener clip assembly configured to securely fasten to a mounting stud of a panel. The assembly may include a main clip and a tapered locking member, such as a tapered locking pin.

The main clip may include a central column defining a central passage. The central column may include a ledge.

The tapered locking pin integrally connects to the central column through at least one flash joint integrally connected to the main clip proximate the ledge. The tapered locking pin is configured to move into the central passage in order to securely fasten the assembly to the mounting stud.

The central column may have a series of longitudinal ribs extending from an interior surface.

The tapered locking pin may include an expanded end integrally connected to a tip through a shaft. The tapered locking pin may taper down from the expanded end to the tip at a constant angle. Additionally, the tapered locking pin may include at least one longitudinal notch.

The main clip may include opposing clipping members on opposite sides of the central column. Each of the clipping members may include opposing flexible legs having ramped apexes. The clipping members may be configured to snapably secure to an attachment.

The central passage may include an opening proximate the ledge that has a smaller diameter than an expanded end of the tapered locking pin.

Certain embodiments of the present invention provide a fastening clip assembly configured to securely fasten to a mounting stud of a panel. The assembly may include opposing clipping members integrally connected with a connecting member, such as a rounded nub, and a tapered securing beam extending from the connecting member between the opposing clipping members. The tapered securing beam includes an expanded end connected to a distal tip through a tapering shaft. The expanded end integrally and fixedly connects to the connecting member. The tapered connecting beam may taper down from the expanded end to the distal tip at a constant angle.

Certain embodiments of the present invention provide an assembly including a trim panel and a fastening clip sub-assembly. The trim panel includes a mounting stud. The fastening clip sub-assembly is configured to securely fasten to a mounting stud of a panel, said fastening clip sub-assembly may include a main clip and a tapered locking member, as described above. The tapered locking member, such as a locking pin or a tapered securing beam, is configured to move into the central passage in order to securely fasten the fastening clip sub-assembly to the mounting stud.

The mounting stud may include a plurality of petal beams defining an interior passage therebetween. Adjacent petal beams may be separated by channels. The channels receive and retain interior ribs extending within the central column. A locking pin may be configured to be urged into the interior passage and spread the petal members outwardly into interior surfaces of the central column such that the petal members are compressively sandwiched between the locking pin and the central column. In this manner, the fastening clip sub-assembly may securely fasten to the trim panel.

Figure 1:
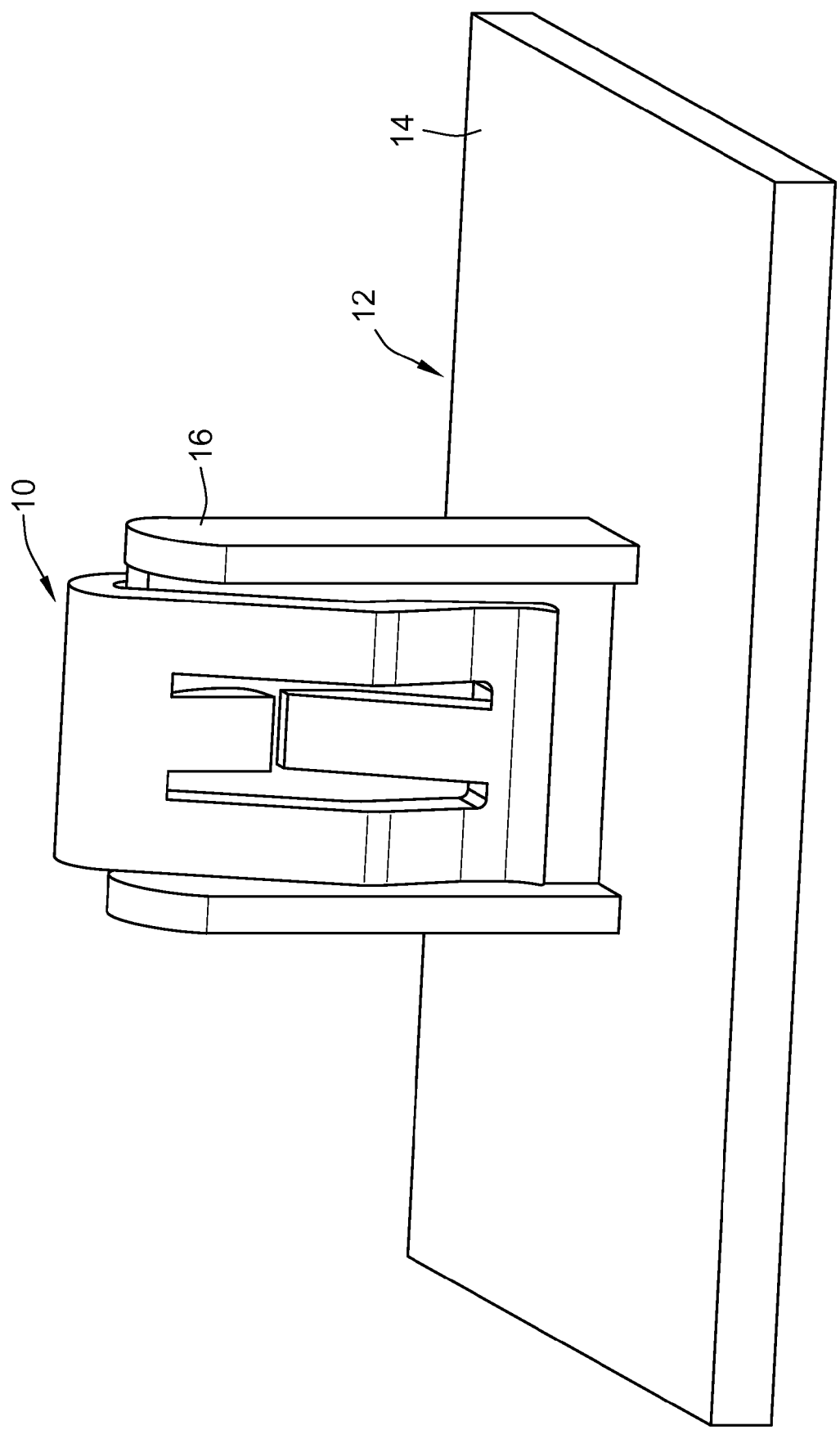
FIG. 1 illustrates an isometric view of a conventional plastic clip secured to a trim panel.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 3:
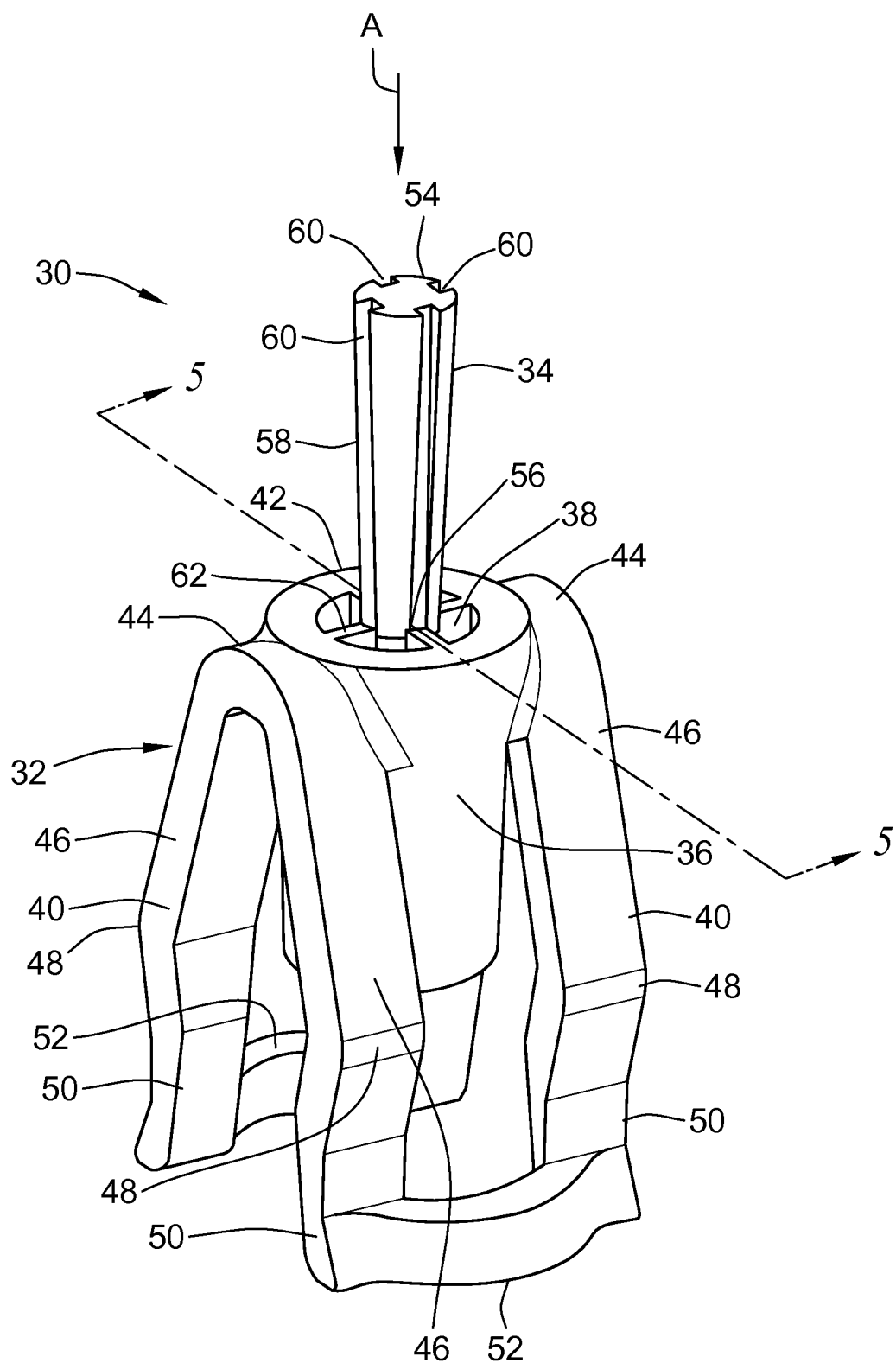
FIG. 3 illustrates an isometric top view of a fastening clip assembly, according to an embodiment of the present invention.

FIG. 3 illustrates an isometric top view of a fastening clip assembly 30, according to an embodiment of the present invention. The assembly 30 may be formed of molded plastic and includes a main clip 32 and a locking pin 34 integrally formed with the main clip 32.

The main clip 32 includes a central column 36 having a central passage 38 formed therethrough. Clipping members 40 extend downwardly from outer edges of a top ledge 42 of the central column 36. As shown in FIG. 3, the assembly 30 includes two opposing clipping members 40 on opposite sides of the central column 36. In general, the clipping members 40 are evenly spaced from one another about the central column 36. However, more clipping members 40 may be used than those shown, and the clipping members 40 may be spaced differently than that shown.

Each clipping member 40 integrally connects about the central column through a curved, anchoring flexible joint 44. Opposing legs 46 extend downwardly from the joint 44. Each leg 46 extends downwardly and outwardly to a ramped apex 48, which, in turn, integrally connects to a recessed lower beam 50. Each recessed lower beam 50 of one clipping member 40 may integrally connect to another recessed lower beam 50 of an opposing clipping member 40 through a horizontally-aligned base 52. The bases 52 are configured to support the assembly 30 over a trim panel.

The opposing legs 46 of each clipping member 40 are flexible and are configured to flex inwardly when inserted into a fastening channel or hole, and snap outwardly after the apexes 48 pass therethrough. Accordingly, an opening of an attachment (not shown) may be urged over the assembly 30 in the direction of arrow A. As the interior edges defining the opening of the attachment slide over the legs 46, the legs 46 of each clipping member 40 flex toward one another. As the attachment continues to be urged past the apexes 48, the legs 46 flex or snap back, thereby providing a larger diameter than the opening in the attachment and securely locking the attachment in place. As such, the attachment may be snapably secured to the assembly 30.

The locking pin 34 includes an expanded end 54 connected to a tip 56 through a tapered shaft 58. That is, the locking pin 34 tapers down from the expanded end 54 to the top 56. For example, the pin 34 may taper at a constant angle of less than 10° (in particular, the angle may be in the range of 0.25°-7°, and preferably in the range of 0.25°-1.5°). The diameter of the expanded end 54 is greater than the diameter of the tip 56. Evenly-spaced notches 60 are formed along the length of the pin 34 from the expanded end 54 to the tip 56.

The locking pin 34 is integrally formed with the main clip 32 by way of flash joints 62 that integrally connect the tip 56 of the pin 34 to interior edges of the top ledge 42 of the main clip 32. The locking pin 34 and the main clip 32 may be integrally formed as a single piece through an injection molding process.

The flash joints 62 are configured to break when the pin 34 is driven into the central passage 38 of the column 36 in the direction of arrow A. The pin 34 is driven into the central passage 38 in order to securely fasten the assembly 30 to a mounting stud of a trim panel, as described below.

Figure 4:
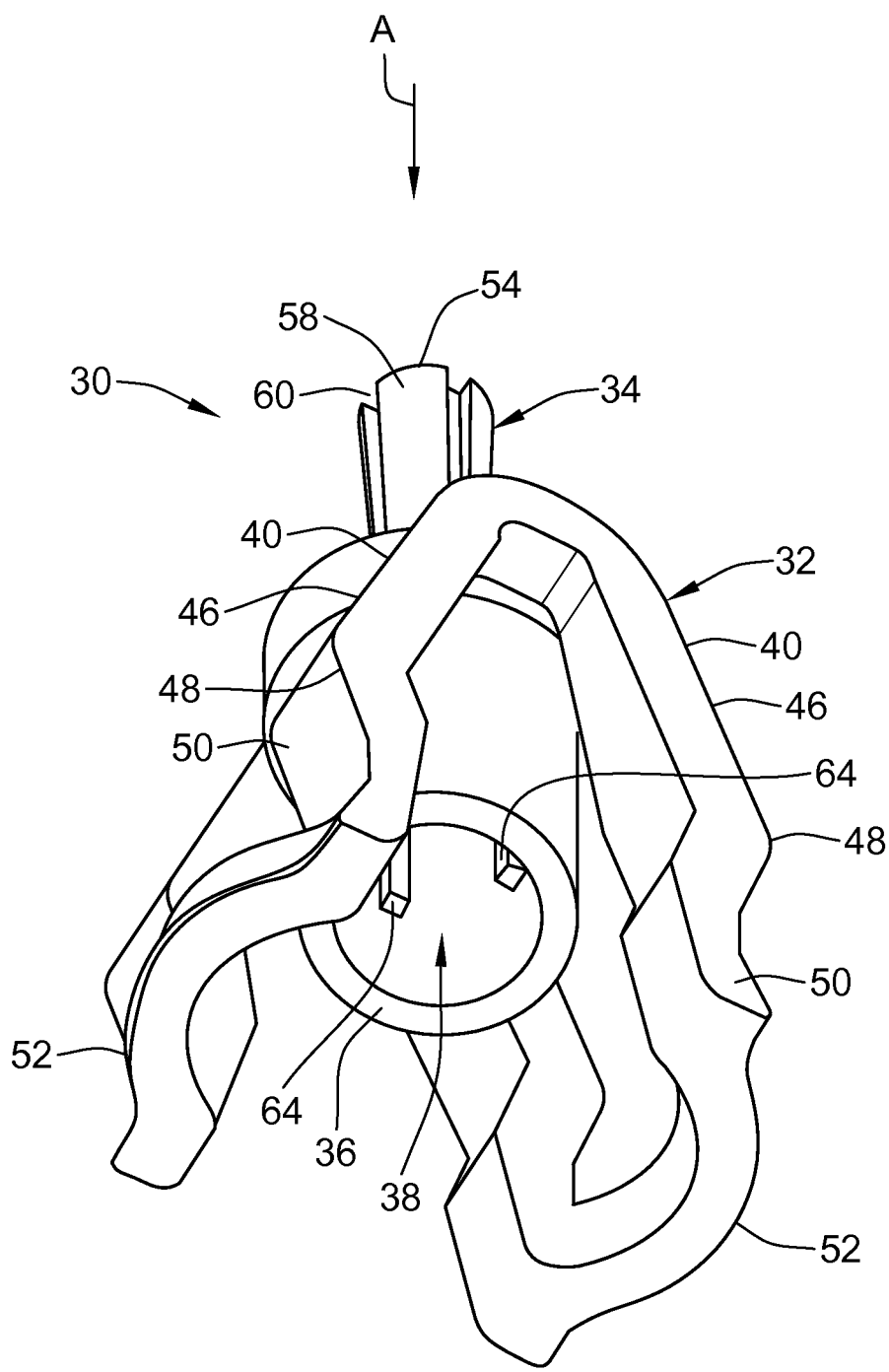
FIG. 4 illustrates an isometric bottom view of a fastening clip assembly, according to an embodiment of the present invention.
Figure 5:
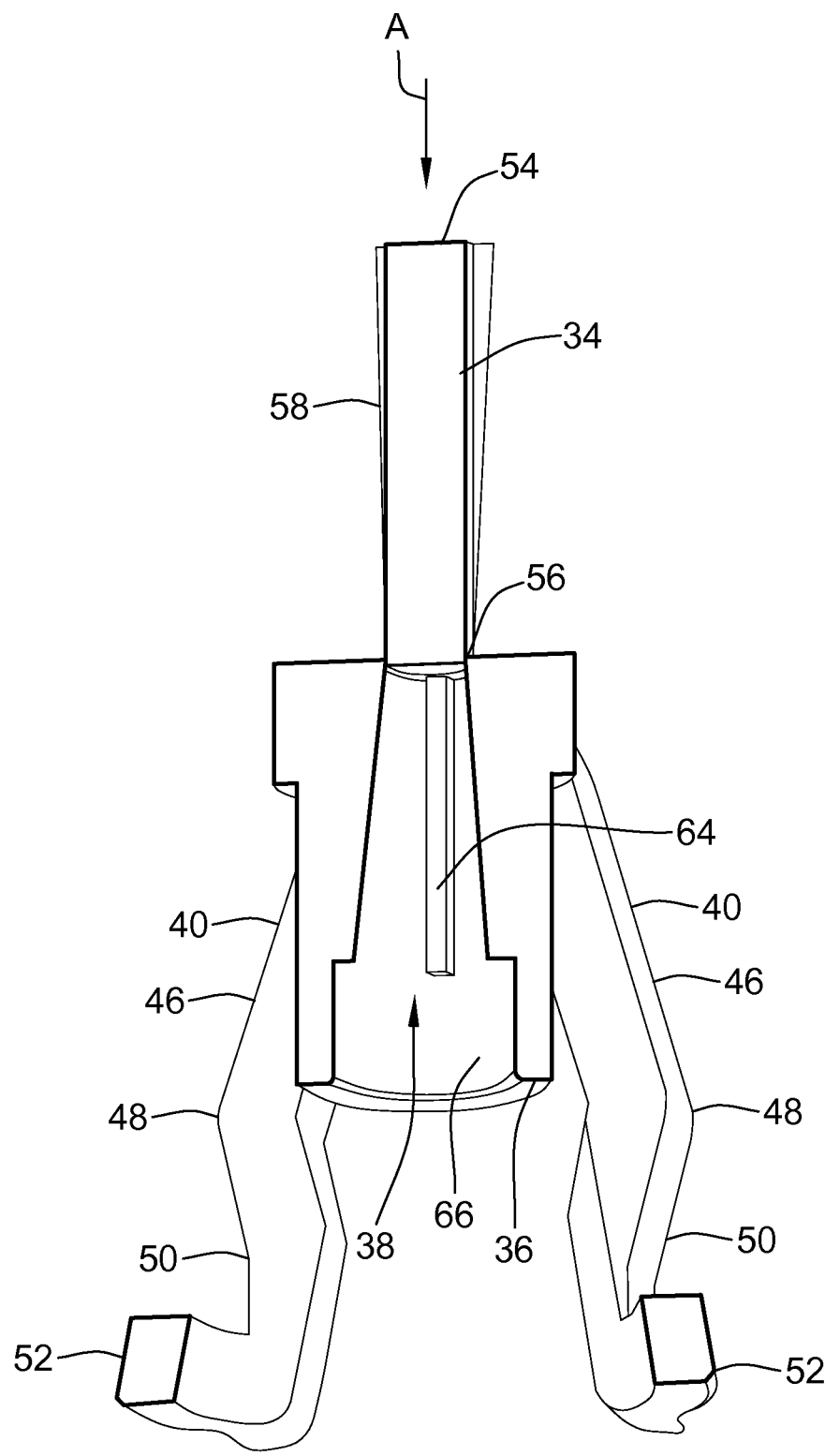
FIG. 5 illustrates a cross-sectional view of a fastening clip assembly through line 5-5 of FIG. 3, according to an embodiment of the present invention.

FIG. 4 illustrates an isometric bottom view of the fastening clip assembly 30. FIG. 5 illustrates a cross-sectional view of the fastening clip assembly 30 through line 5-5 of FIG. 3. Referring to FIGS. 4 and 5, the central column 36 of the main clip 32 includes the passage 38 formed therethrough. Interior surfaces of the central column 36 that define the passage 38 include evenly spaced ridges 64. The ridges 64 are configured to be positioned between petal beams of a mounting stud of trim panel, as discussed below. The ridges 64 ensure that the fastening assembly 30 is properly aligned and mounted with respect to the mounting stud, by way of the ridges 64 nesting between the petal beams.

As shown in FIG. 5, the central passage 38 formed through the central column 36 expands from top to bottom and connects to an open chamber 66, which is generally wider than the expanded end 54 of the pin 34 (that is, the central passage tapers from bottom to top, inversely to the taper of the shaft 58 of the pin 34). The top of the central passage 38 is wide enough to allow the tip 56 of the pin 34 to pass. As the pin 34 continues to pass into the passage 38, the wider portions of the pin 34 expand the upper portions of the column 35, due to the smaller diameter of the top of the passage 38.

Figure 6:
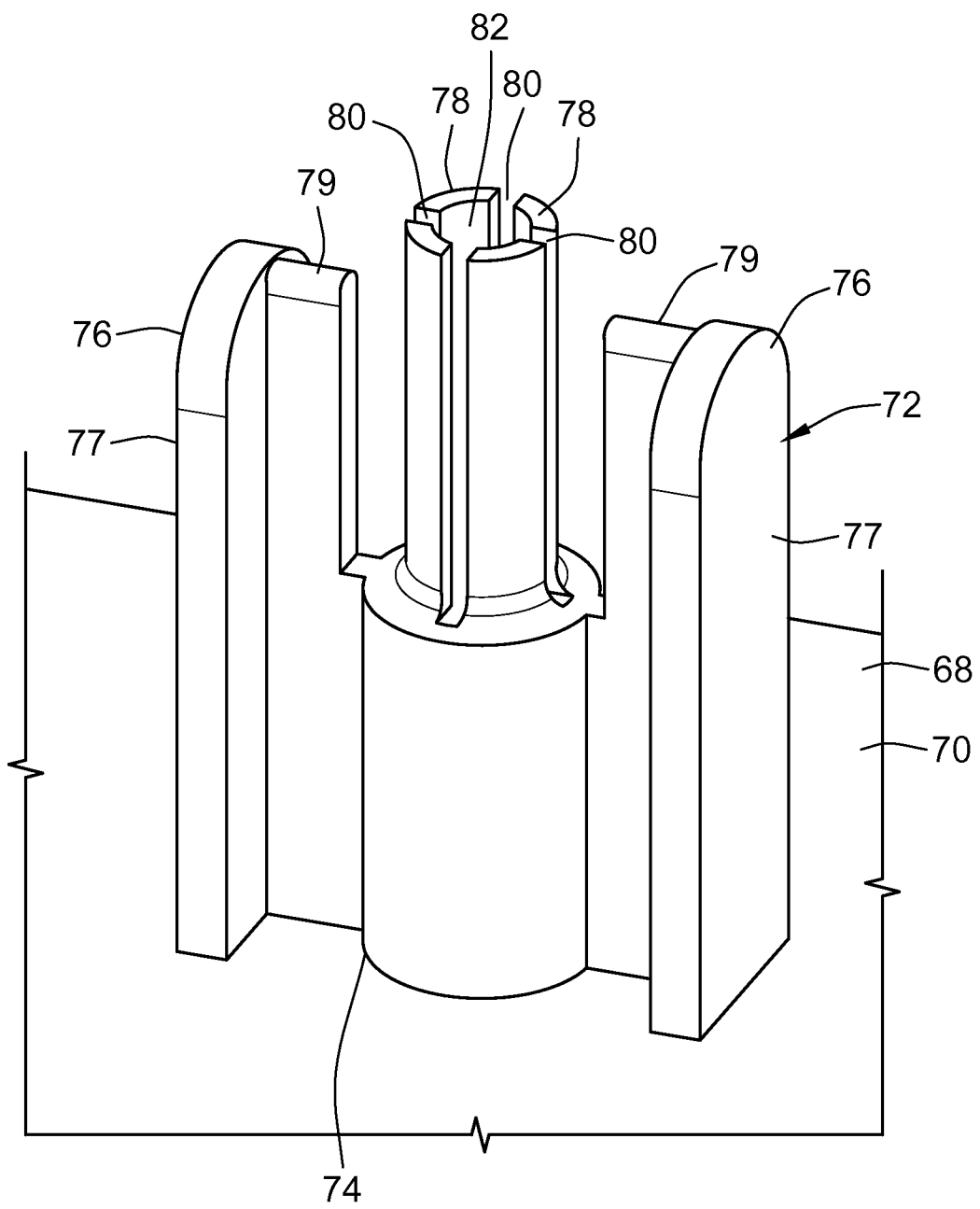
FIG. 6 illustrates an isometric top view of a trim panel, according to an embodiment of the present invention.

FIG. 6 illustrates an isometric top view of a trim panel 68, according to an embodiment of the present invention. The trim panel 68 includes a planar base 70 with a mounting stud 72 extending upwardly therefrom.

The mounting stud 72 includes a central post 74 integrally connected to support struts 76. Each support strut 76 includes a shielding wall 77 integrally connected to clip support 79, which extends inwardly from the shielding wall 77 in a perpendicular fashion.

Petal beams 78 extend upwardly from the post 74. As shown in FIG. 6, four petal beams 78 are separated by longitudinal channels 80. An interior central passage 82 is formed between the petal beams 78. A diametric length between opposing petal beams 78 is less than the diameter of the post 74. Alternatively, more or less petal beams 78 than those shown may be used, depending on the configuration of the locking pin 34, shown in FIGS. 3-5.

Figure 7:
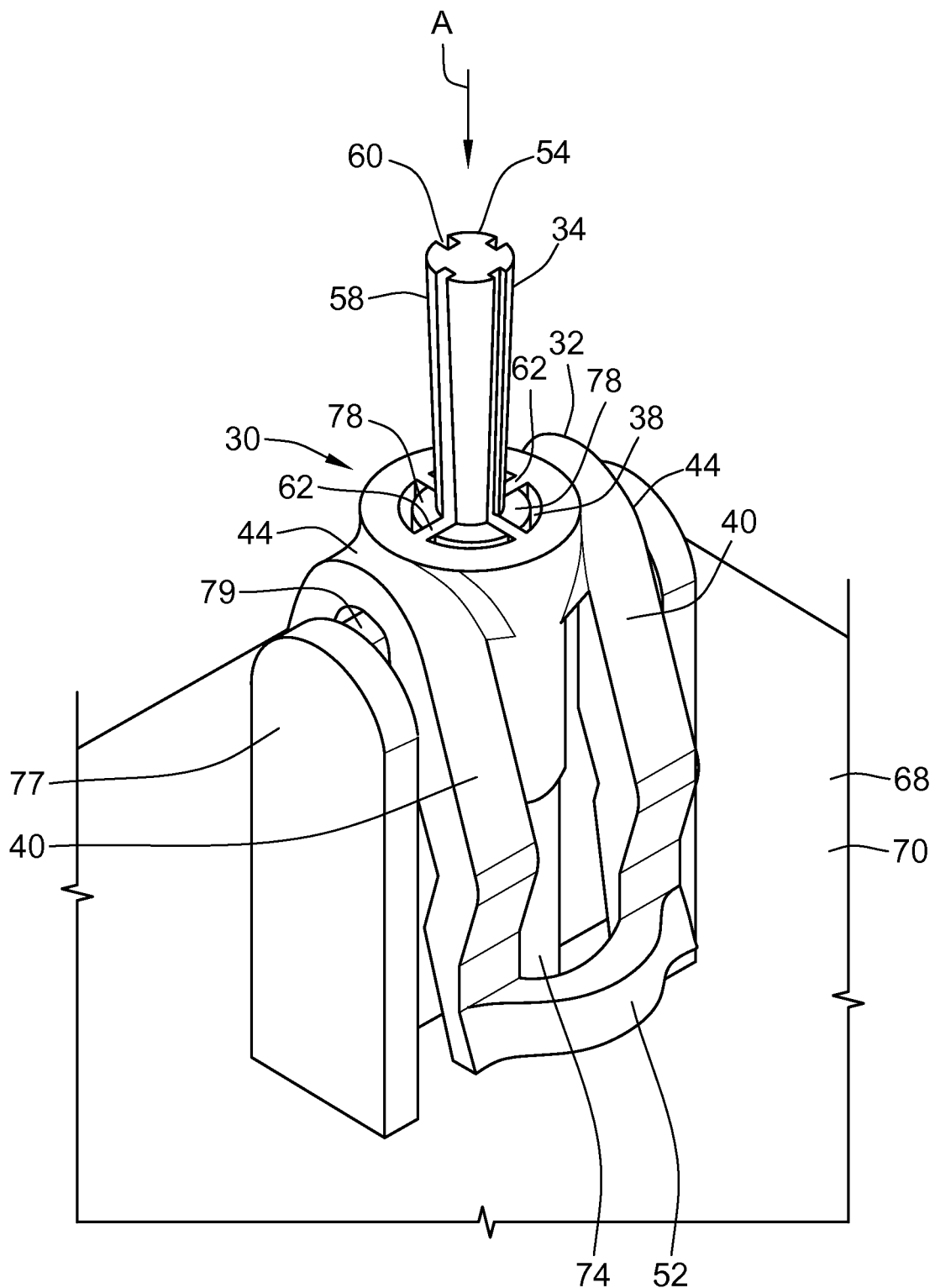
FIG. 7 illustrates an isometric top view of a fastening clip assembly mounted over a mounting stud of a trim panel, according to an embodiment of the present invention.
Figure 8:
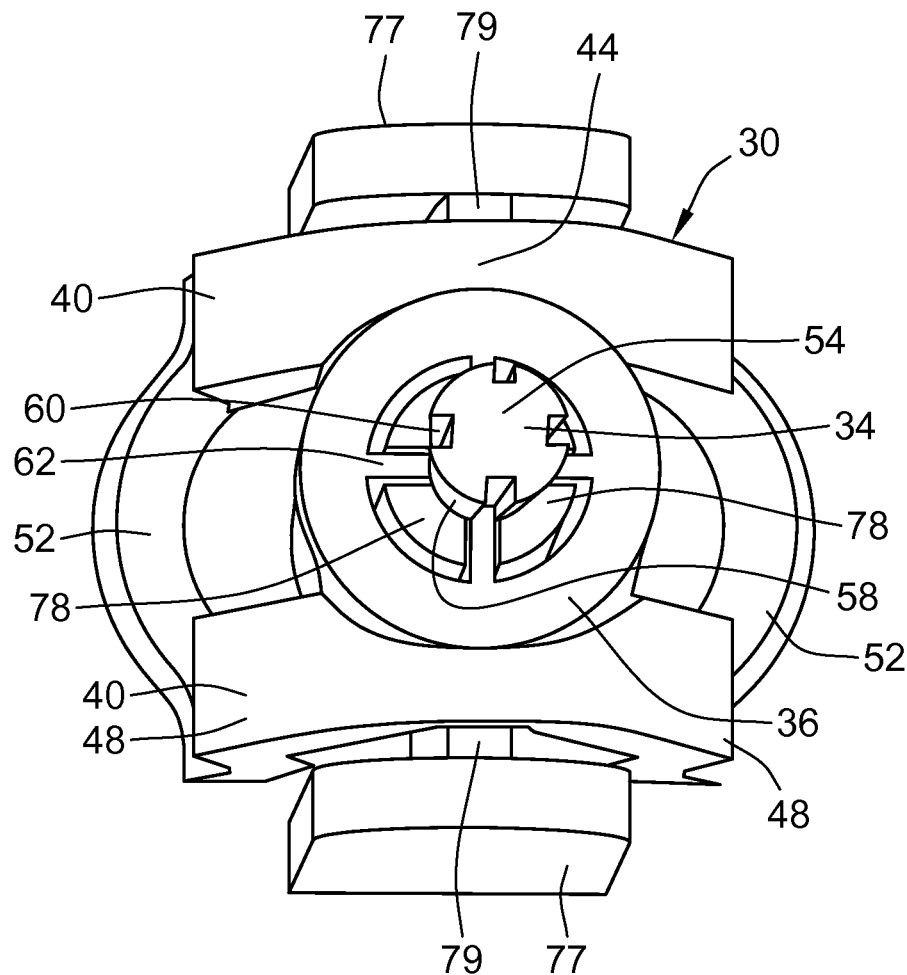
FIG. 8 illustrates a top view of a fastening clip assembly mounted over a mounting stud of a trim panel, according to an embodiment of the present invention.

FIG. 7 illustrates an isometric top view of the fastening clip assembly 30 mounted over the mounting stud 72 of the trim panel 68, according to an embodiment of the present invention. FIG. 8 illustrates a top view of the fastening clip assembly 30 mounted over a mounting stud 72 of the trim panel 68.

Referring to FIGS. 7 and 8, the clip assembly 30 is aligned over the mounting stud 72 so that the central passage 38 of the main clip 32 is axially aligned with the interior passage 82 (shown in FIG. 6) defined between the petal beams 78.

The flexible joints 44 are supported by and over the clip supports 79. The bases 52 are positioned about the central post 74 and abut a top surface of the planar base 70. Clearance areas exist between the bases 52 and the central post 74 to allow the clipping members 40 to flex inwardly when an attachment is snapably secured to the clip assembly 30, as described above.

As shown in FIG. 7, the flash joints 62 are aligned over the channels 80 between adjacent petal beams 78. The notches 60 of the locking pin 34 are generally aligned with the flash joints 62 and the channels 80, such that the main body portions of the shaft 58 are aligned with the petal beams 78. Additionally, the ridges 64 (shown in FIG. 4) are nestled within the channels 80 between adjacent petal beams 78, thereby ensuring that the assembly 30 is properly aligned with respect to the mounting stud 72.

Figure 9:
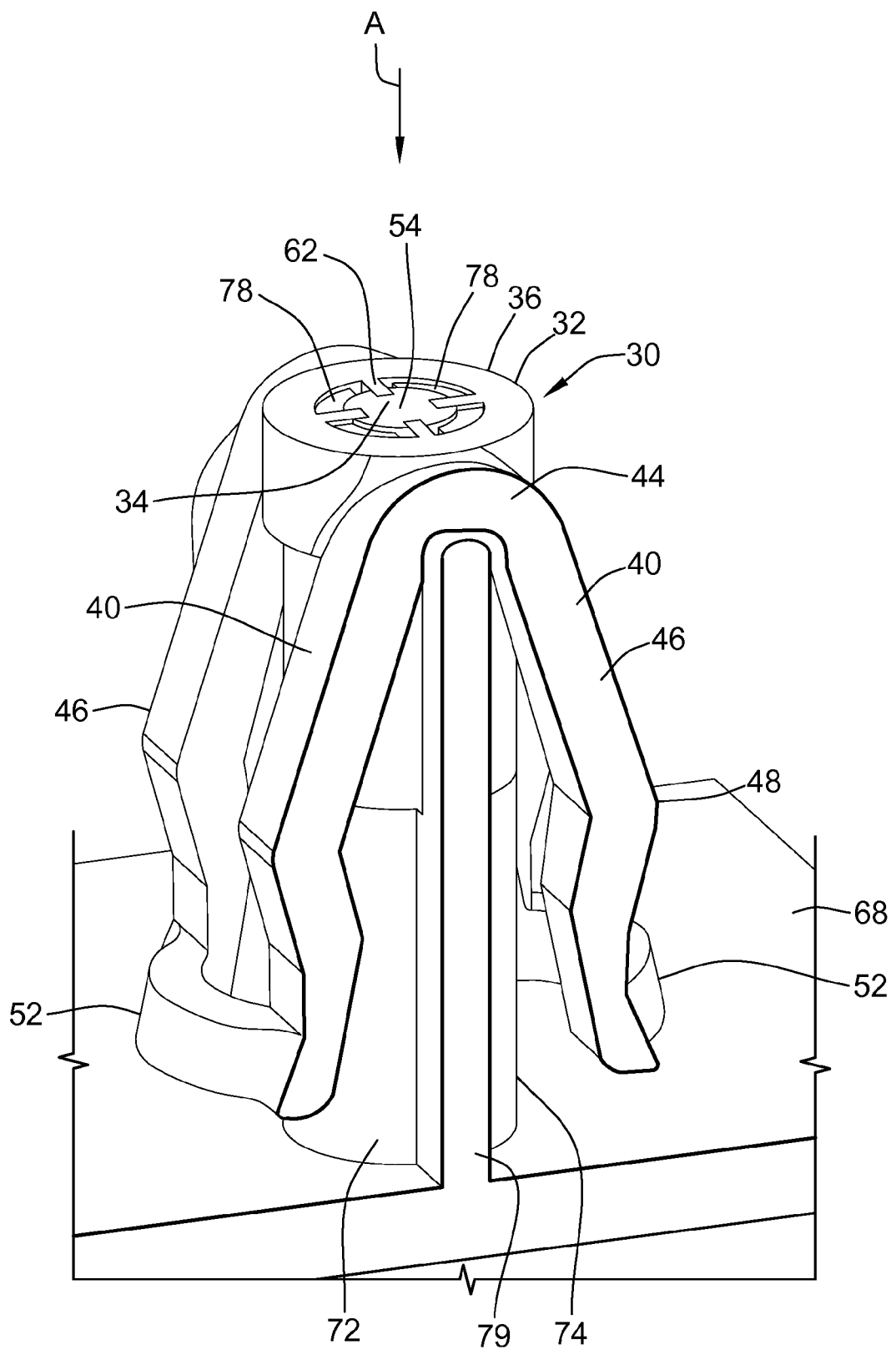
FIG. 9 illustrates an isometric top view of a fastening clip assembly securely fastened to a trim panel, according to an embodiment of the present invention.
Figure 10:
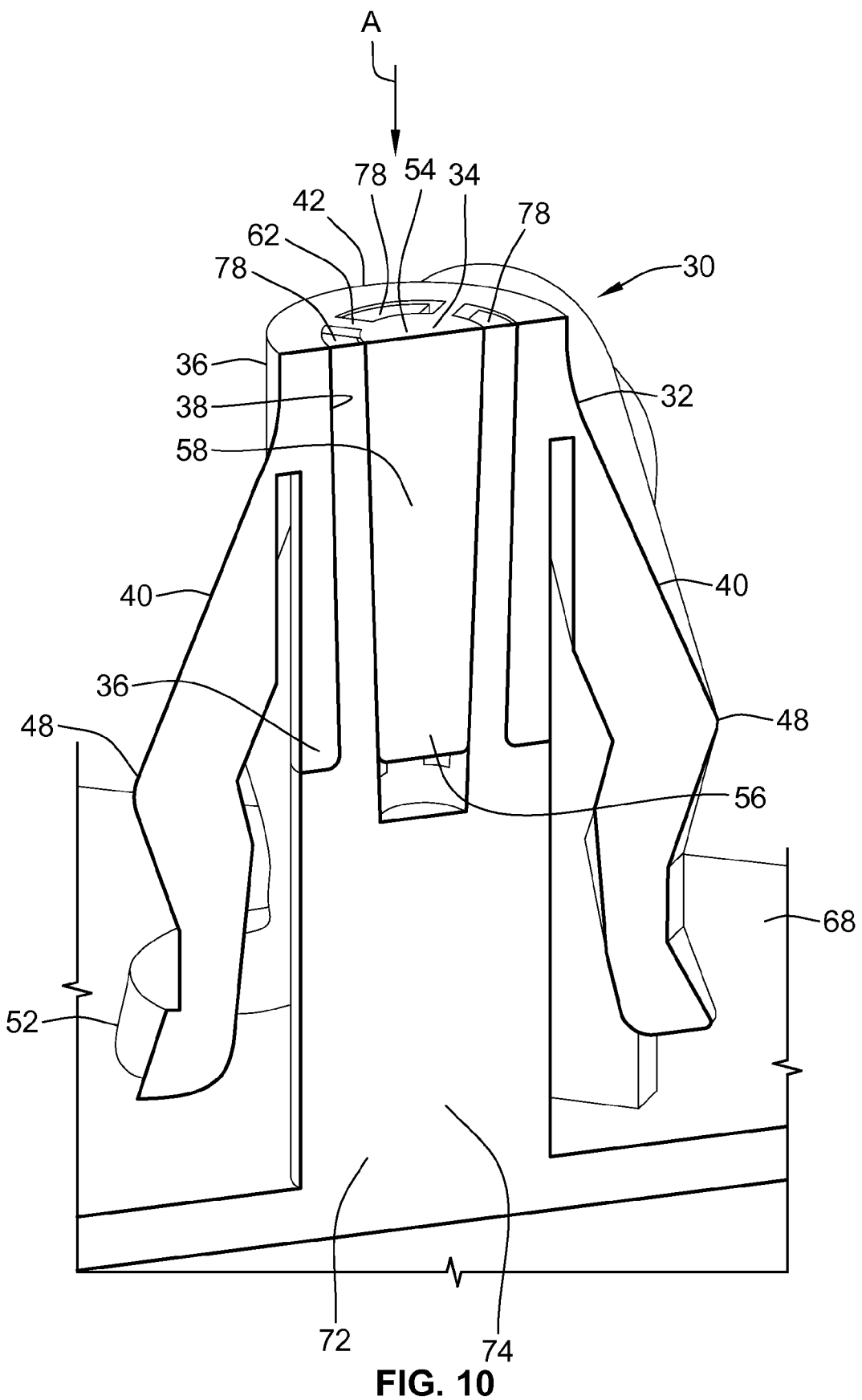
FIG. 10 illustrates an internal cross-sectional view of a fastening clip assembly secured to a trim panel, according to an embodiment of the present invention.

FIG. 9 illustrates an isometric top view of the fastening clip assembly 30 securely fastened to the trim panel 68. according to an embodiment of the present invention. Note, the front shielding wall 77 is not shown for the sake of clarity. FIG. 10 illustrates an internal cross-sectional view of the fastening clip assembly 30 secured to the trim panel 68.

Referring to FIGS. 9 and 10, in order to secure the assembly 30 to the trim panel 68, the locking pin 34 is urged into the interior passage 82 (shown in FIG. 6) between the petal beams 78. As shown in FIG. 10, the bottom edge of the central column 36 rests on a ledge formed by the central post 74.

As the locking pin 34 is forced downward in the direction of arrow A, the locking pin 34 breaks away from the flash joints 62. As the larger diameters of the upper portions of the locking pin 34 move into the interior passage 82, the shaft 58 of the locking pin 34 spreads the petal beams 78 outward into interior surfaces of the central column 36. When the locking pin 34 is urged fully in the direction of arrow A, the expanded end 54 is generally flush with the upper edge 42 of the central column 36. In this position, the expanded end 54 flexes the petal beams 78 outwardly away from one another, such that they are securely pinned into interior surfaces of the column 36. As such, the petal beams 78 are compressively sandwiched between the shaft 58 of the locking pin 34 and interior surfaces of the central column 36, thereby securely fastening the assembly 30 to the mounting stud 72 of the trim panel 68.

As shown and described with respect to FIGS. 3-10, the assembly 30 securely fastens to the trim panel 68. Further, an attachment may snapably secure to the assembly 30, as described above. Thus, unlike conventional fastening clips, the assembly 30 may securely fasten to the trim panel 68 without the use of expensive side-tooling. Instead, as described above, the assembly 30 is mounted on the mounting stud 72, and the locking pin 34 is urged between the petal beams 78 to securely fasten the assembly 30 to the trim panel 68.

Figure 11:
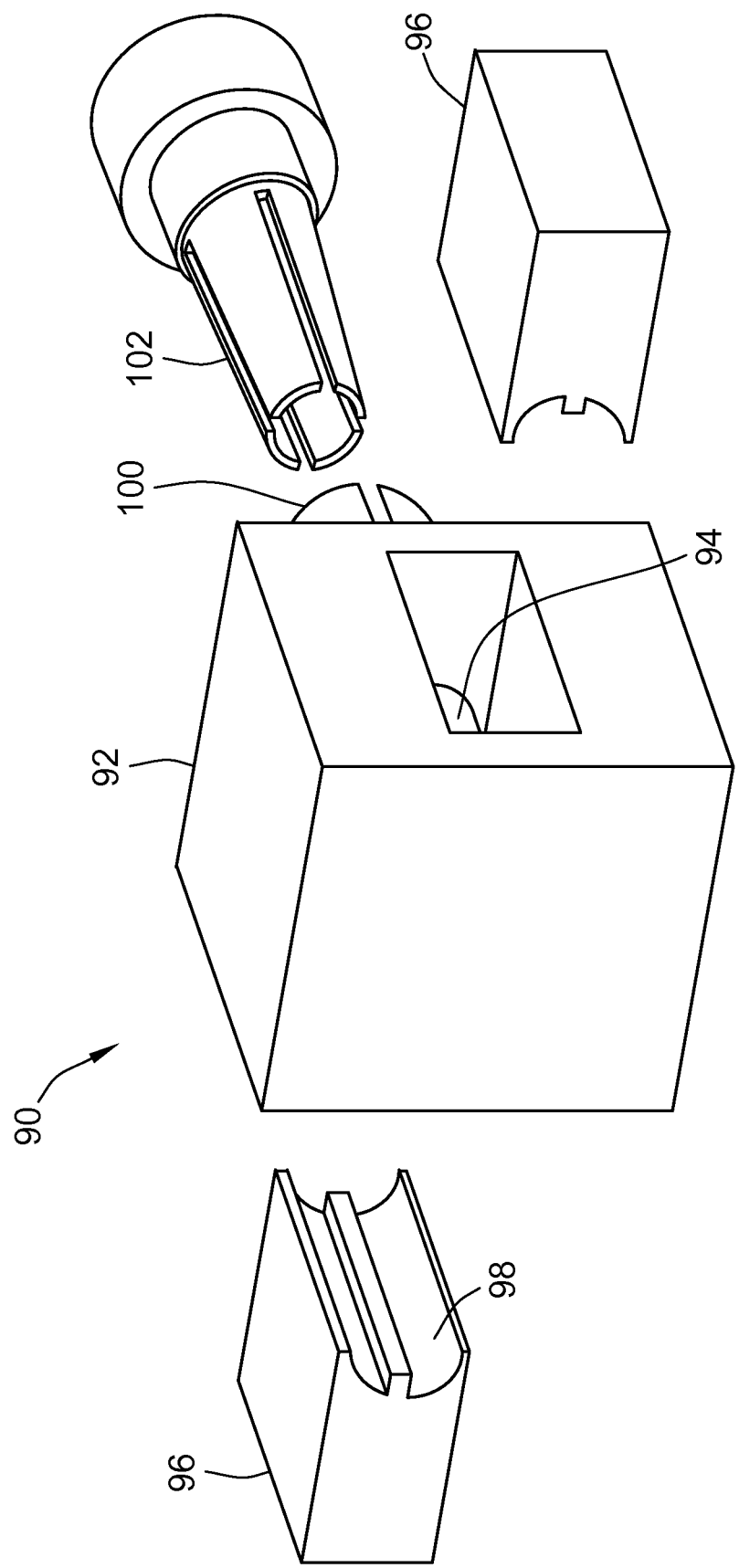
FIG. 11 illustrates an isometric view of an injection mold for a securing pin, according to an embodiment of the present invention.
Figure 12:
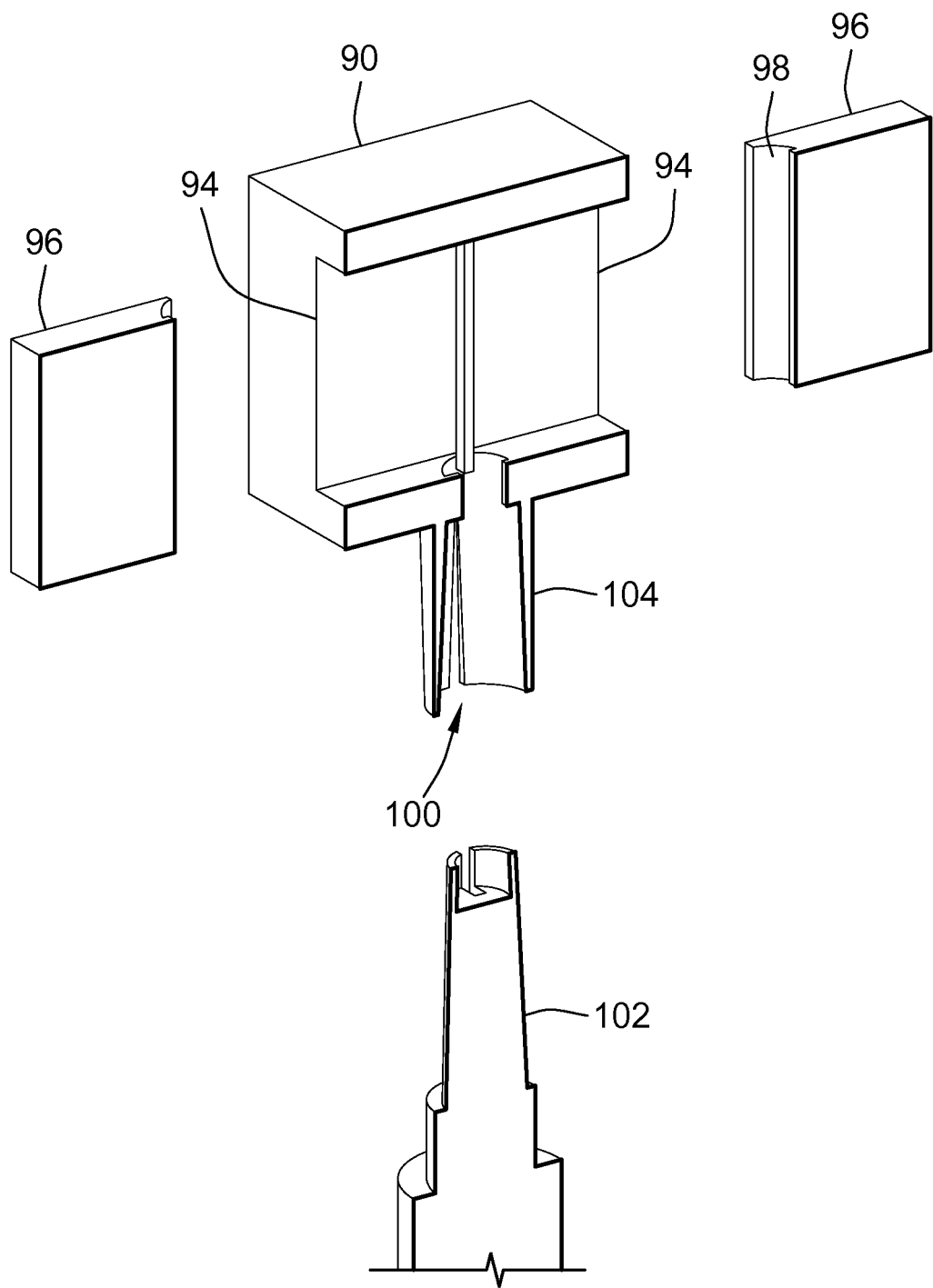
FIG. 12 illustrates an isometric internal view of an injection mold for a securing pin, according to an embodiment of the present invention.

FIG. 11 illustrates an isometric view of an injection mold 90 for a securing pin, according to an embodiment of the present invention. FIG. 12 illustrates an isometric internal view of the injection mold 90 for a securing pin, according to an embodiment of the present invention.

Referring to FIGS. 11 and 12, the injection mold 90 includes a main mold 92 having lateral passages 94. Pin blocks 96 are configured to slide into and out of the lateral passages 94. Each pin block 96 includes a central longitudinal channel 98 sized and shaped as an impression of a half of the locking pin 34, as shown in FIGS. 3-5, for example. The mold 90 also includes an injection channel 100. An injection nozzle 102 of a liquid plastic dispenser is aligned with the injection channel 100 and is configured to inject liquid plastic into the mold chamber through the injection channel 100.

Figure 13:
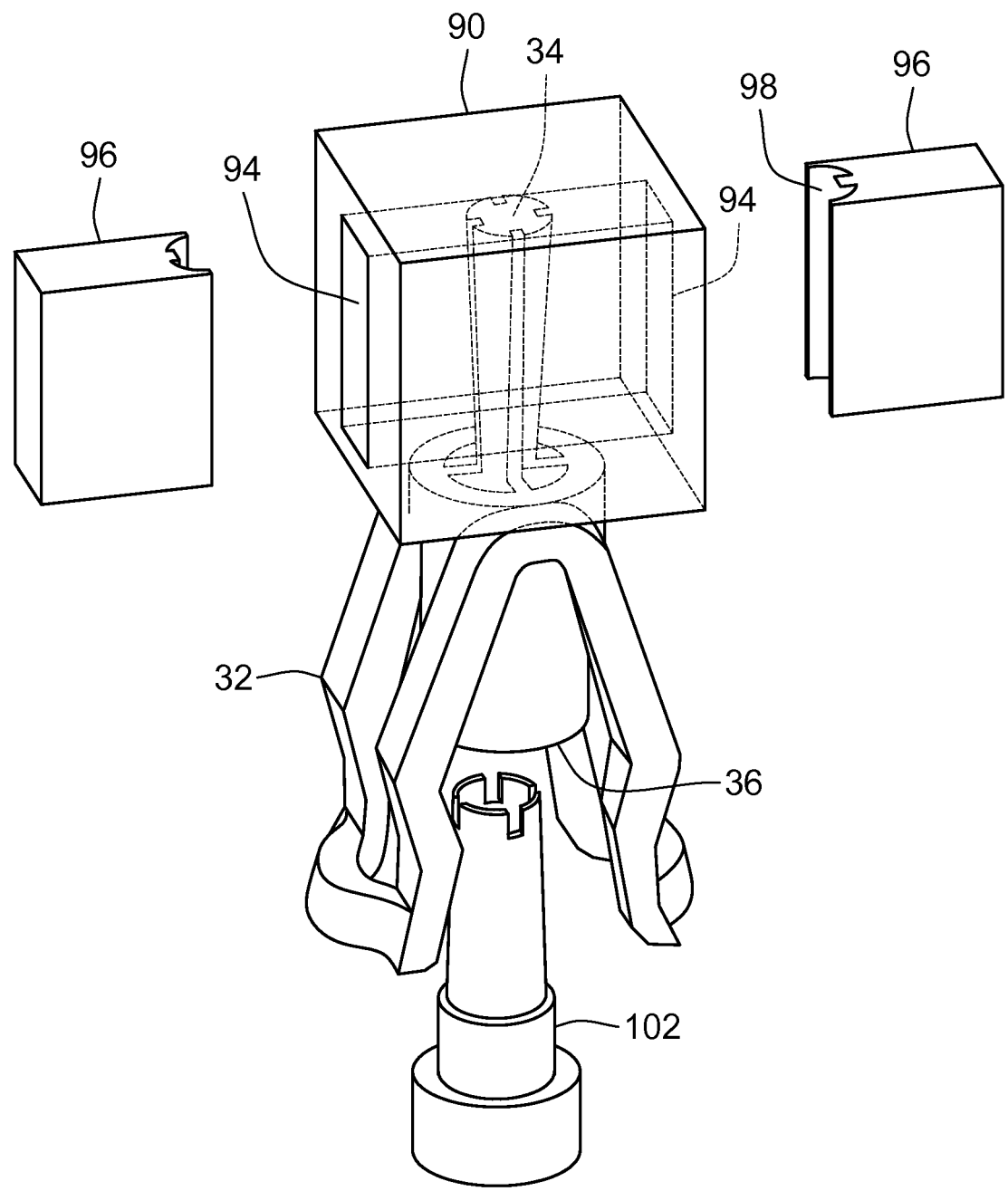
FIG. 13 illustrates an isometric internal view of a securing pin being formed, according to an embodiment of the present invention.

FIG. 13 illustrates an isometric internal view of the securing pin 34 being formed, according to an embodiment of the present invention. The main clip 32 is injection molded or positioned around a column 104 (shown in FIG. 12) extending from the mold 90. For example, the central column 36 may be formed around the column 104 either with a separate mold, or may be formed separately and positioned around the column 104.

The pin blocks 96 are then moved into the channels 94. The injection nozzle 102 then injects liquid plastic into the mold 90 through the injection channel 100 defined by the column 104. The channels 98 of the pin blocks 96 cooperate to form a pin chamber that defines the size and shape of the locking pin 34. The liquid plastic fills the pin chamber. As the plastic cools and hardens, the pin blocks 96 are removed. The locking pin 34 is thereby formed integrally with the main clip 32. That is, the main clip 32 may be concurrently formed through a separate mold. Optionally, the main clip 32 may be preformed and positioned on the mold 90 as described above, and the liquid plastic within the pin chamber may bond to or otherwise join to the main clip 32 at the flash joints 62 (shown, for example, in FIGS. 7 and 8). Thus, the assembly 30 is efficiently formed as a single, unitary piece.

Figure 14:
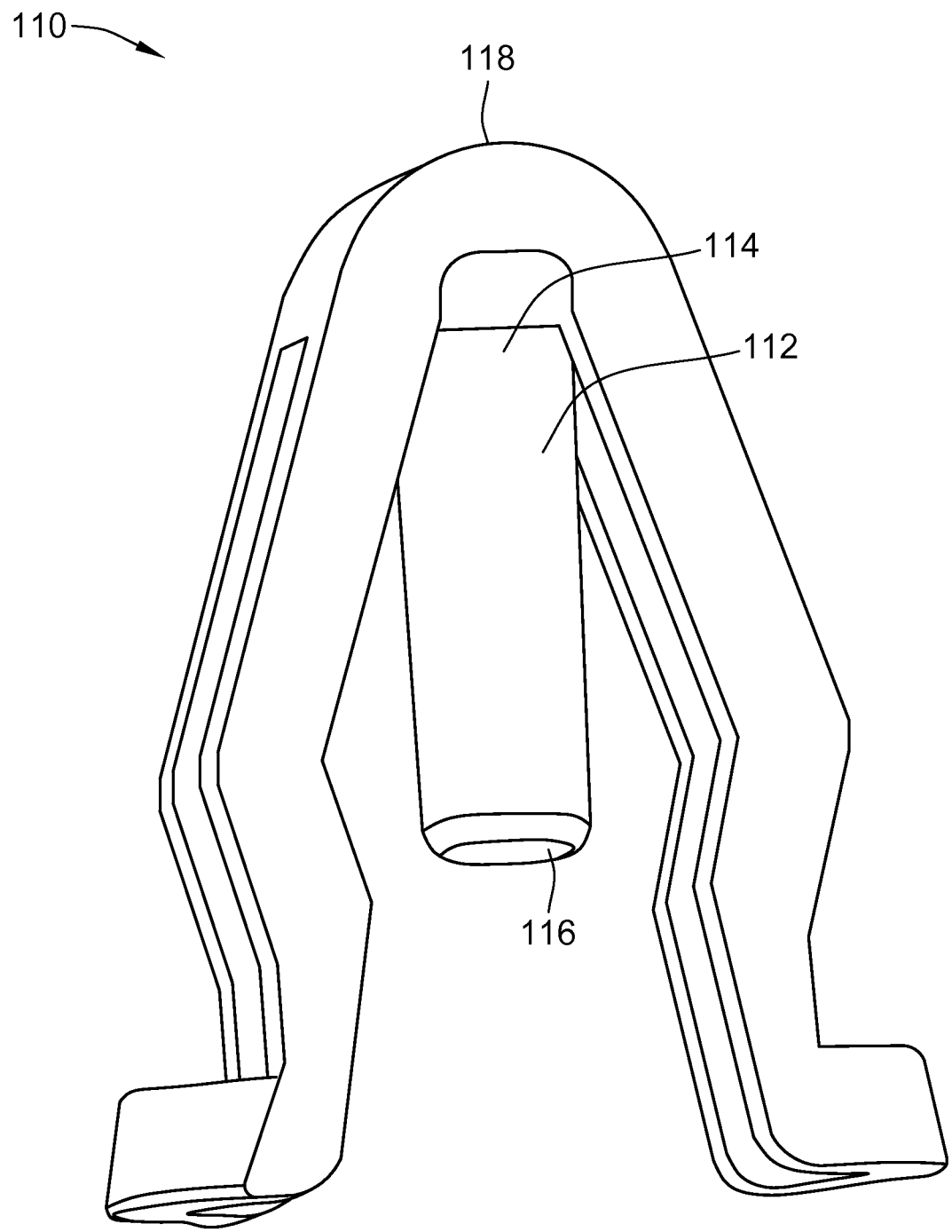
FIG. 14 illustrates an isometric front view of a fastening clip assembly, according to an embodiment of the present invention.

FIG. 14 illustrates an isometric front view of a fastening clip assembly 110, according to an embodiment of the present invention. The fastening clip assembly 110 is similar to the assembly 30 except that, instead of a break-away locking pin, the assembly 110 includes a tapering beam 112 that tapers down from an upper end 114 to a tip 116.

Figure 15:
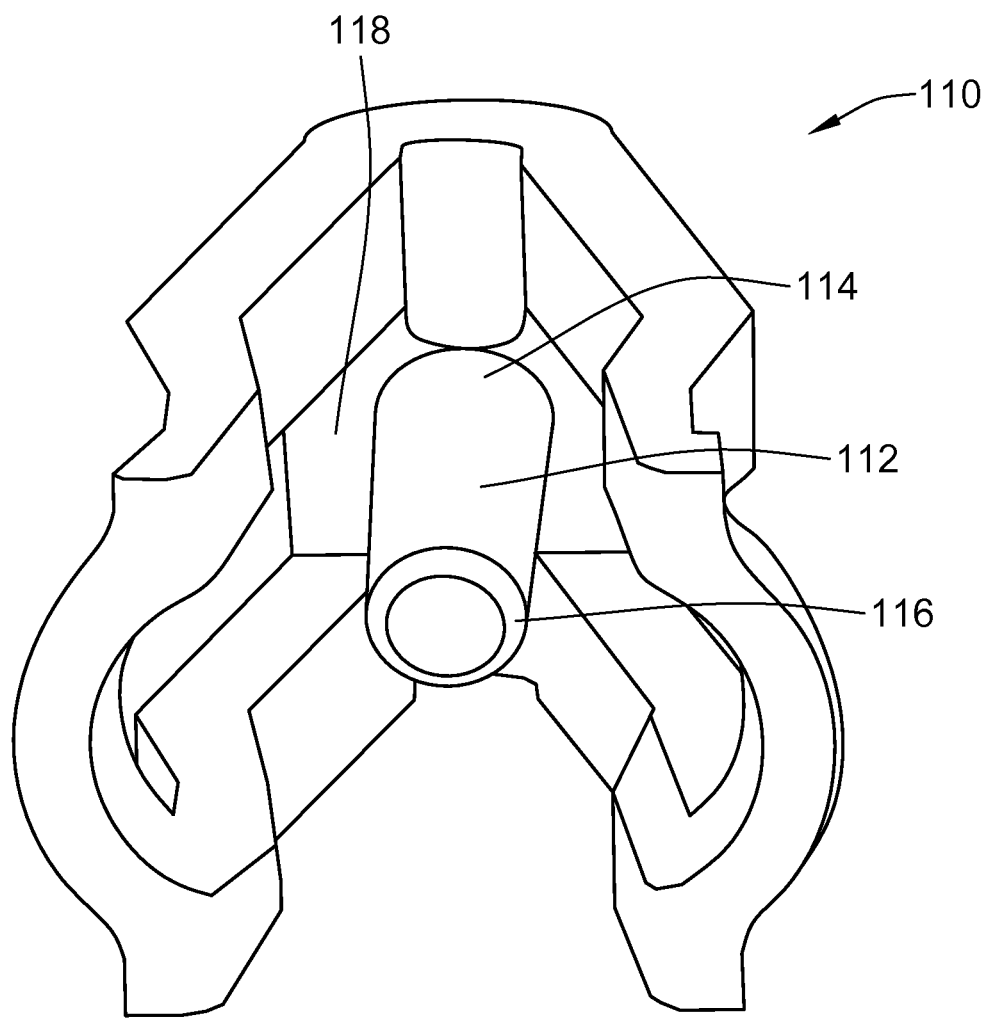
FIG. 15 illustrates an isometric bottom view of a fastening clip assembly, according to an embodiment of the present invention.
Figure 16:
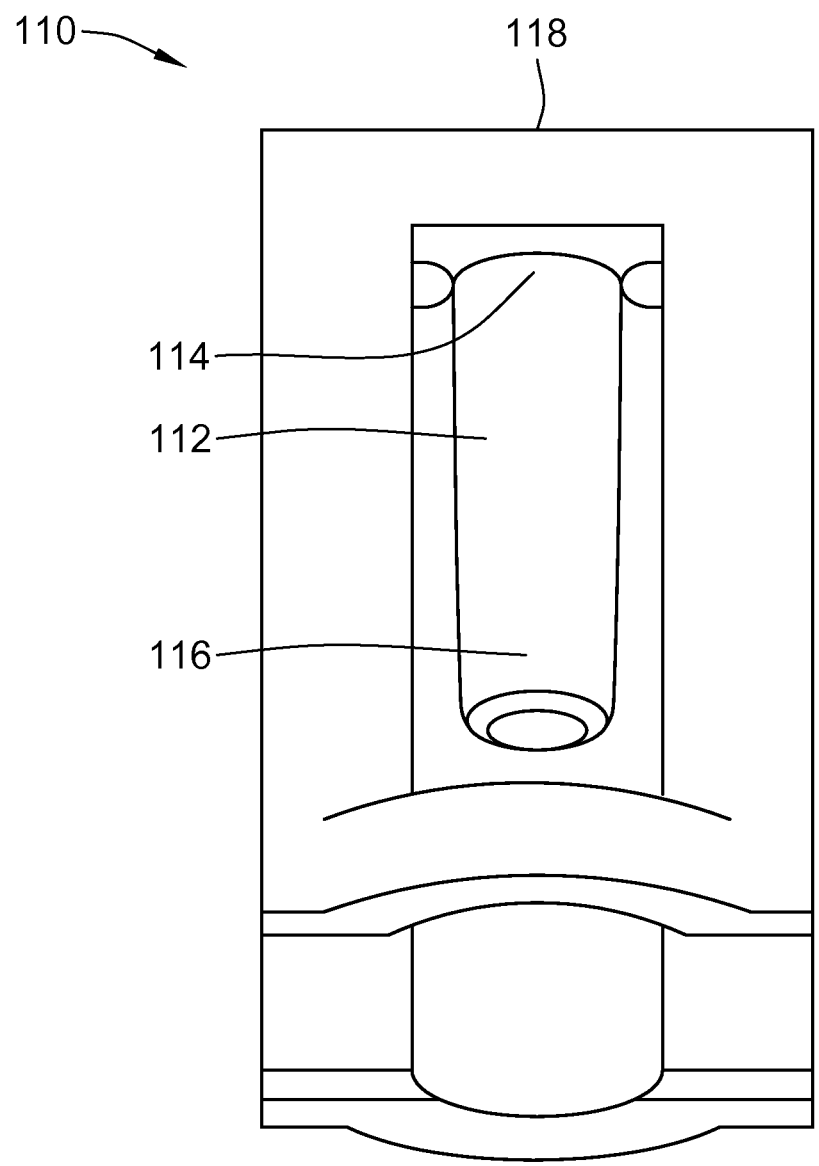
FIG. 16 illustrates an isometric side view of a fastening clip assembly, according to an embodiment of the present invention.

FIGS. 15 and 16 illustrate isometric bottom and side views, respectively, of the fastening clip assembly 110. The tapering beam 112 extends downwardly from a top panel, nub, button, or other such member 118 of the assembly 110, such that the expanded end 114 is proximate the top member 118. Unlike the locking pin, the tapering beam 112 remains fixed to the assembly 110.

Figure 17:
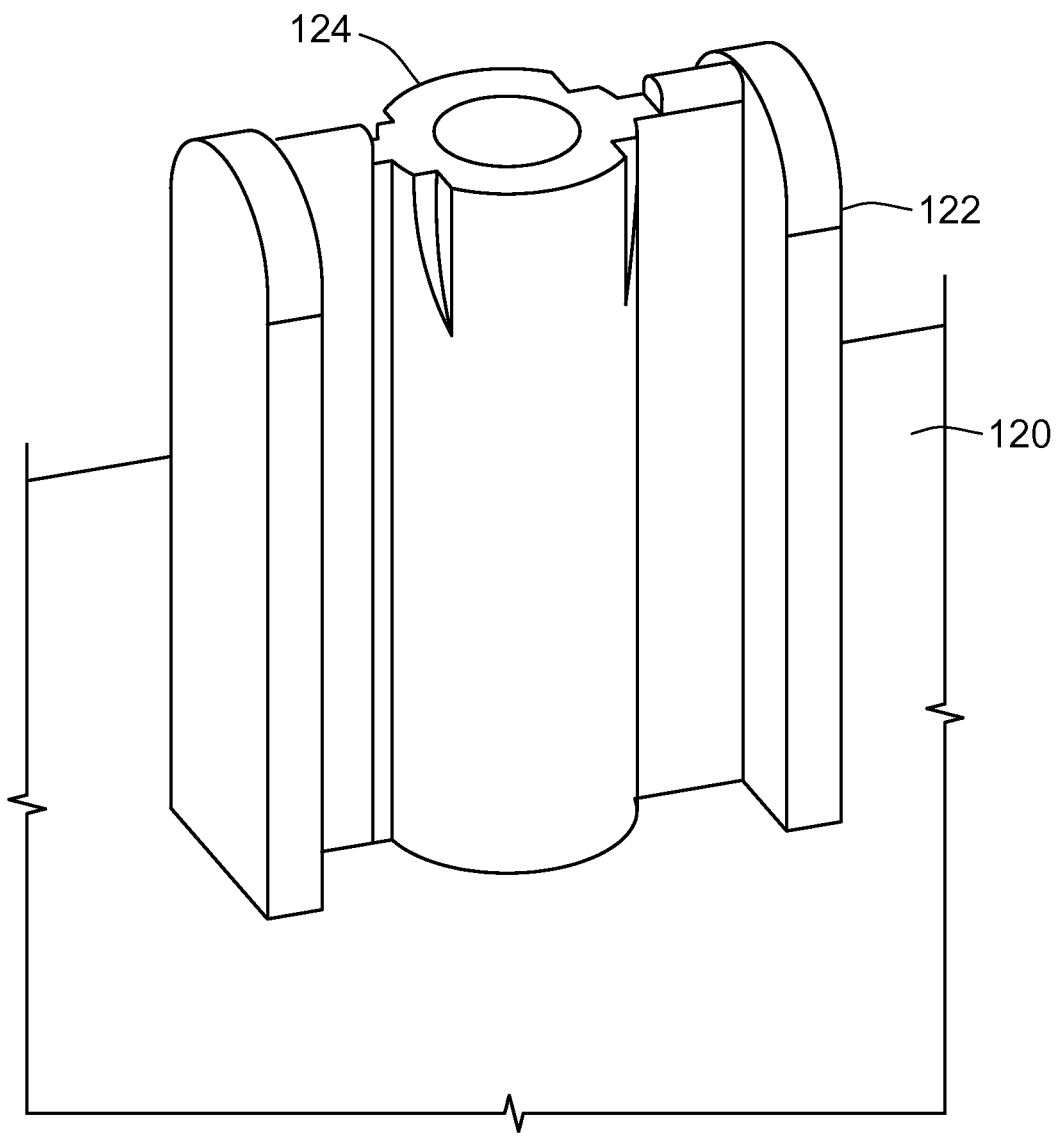
FIG. 17 illustrates an isometric top view of a trim panel, according to an embodiment of the present invention.

FIG. 17 illustrates an isometric top view of a trim panel 120, according to an embodiment of the present invention. The trim panel 120 is similar to that described above, except that the mounting stud 122 includes a sleeve or column 124 configured to receive and securely retain the tapering beam 112, such that the assembly 110 securely fastens to the mounting stud 122.

Figure 18:
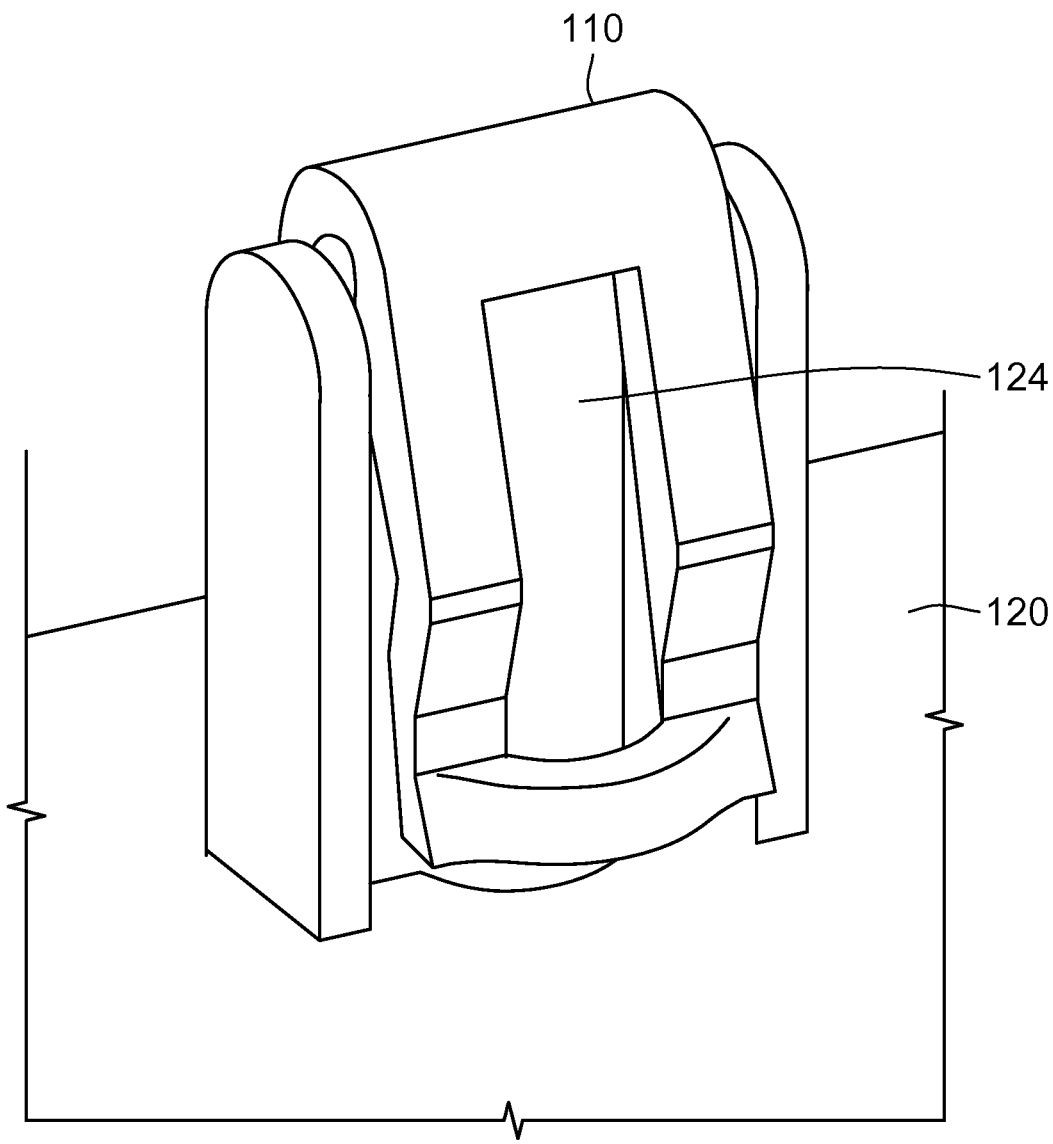
FIG. 18 illustrates an isometric top view of a fastening clip assembly secured to a trim panel, according to an embodiment of the present invention.
Figure 19:
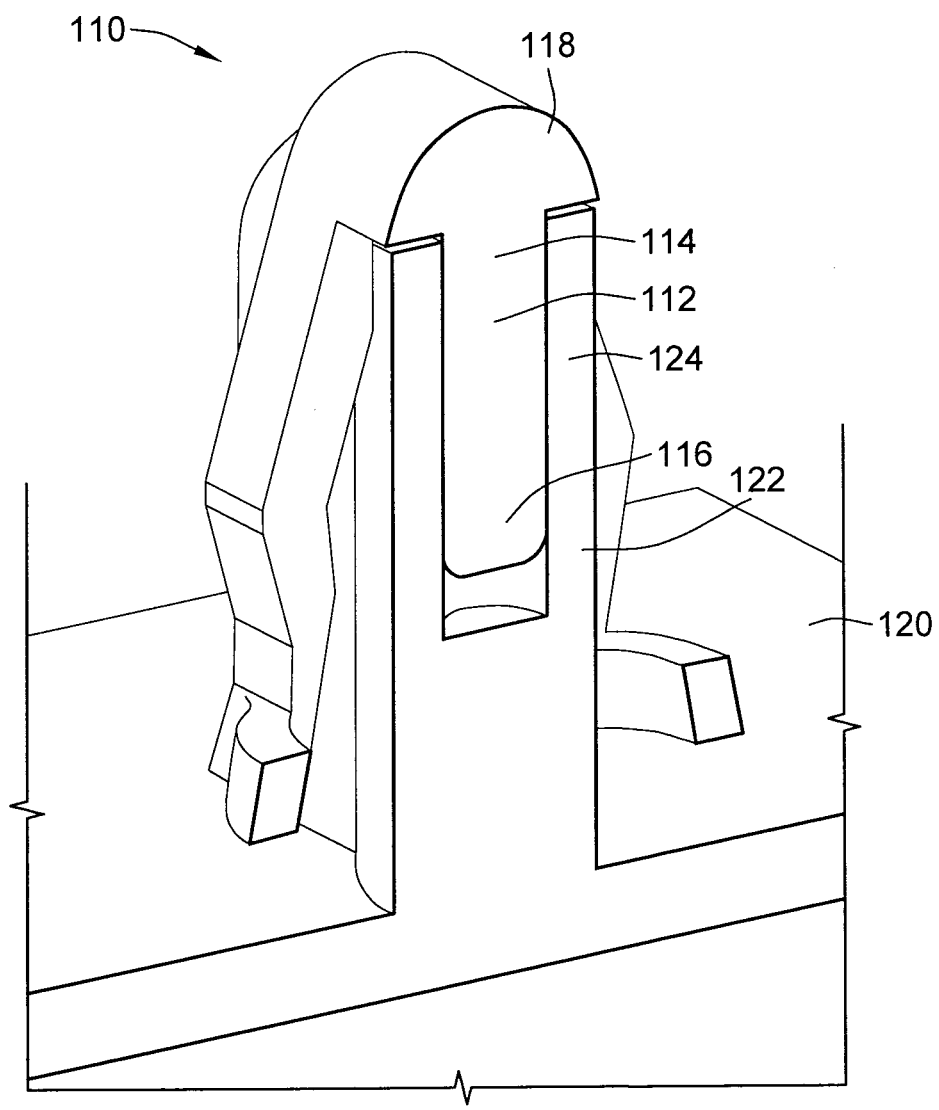
FIG. 19 illustrates an internal cross-sectional view of a fastening clip assembly secured to a mounting stud of a trim panel, according to an embodiment of the present invention.

FIG. 18 illustrates an isometric top view of the fastening clip assembly 30 secured to the trim panel 120, according to an embodiment of the present invention. FIG. 19 illustrates an internal cross-sectional view of the fastening clip assembly 110 secured to the mounting stud 122 of the trim panel 120. Referring to FIGS. 18 and 19, in the secured position, the tapering beam 112 is positioned within the sleeve 124. The tapering beam 112 is snugly and securely retained within the sleeve 124. That is, the upper portion of the opening in the sleeve 124 is smaller than the expanded end 114 of the beam 112. Thus, when the beam 112 is fully inserted, the beam 112 is compressively retained within the sleeve 124, thereby securing the assembly 110 to the mounting stud 122.

Figure 2:
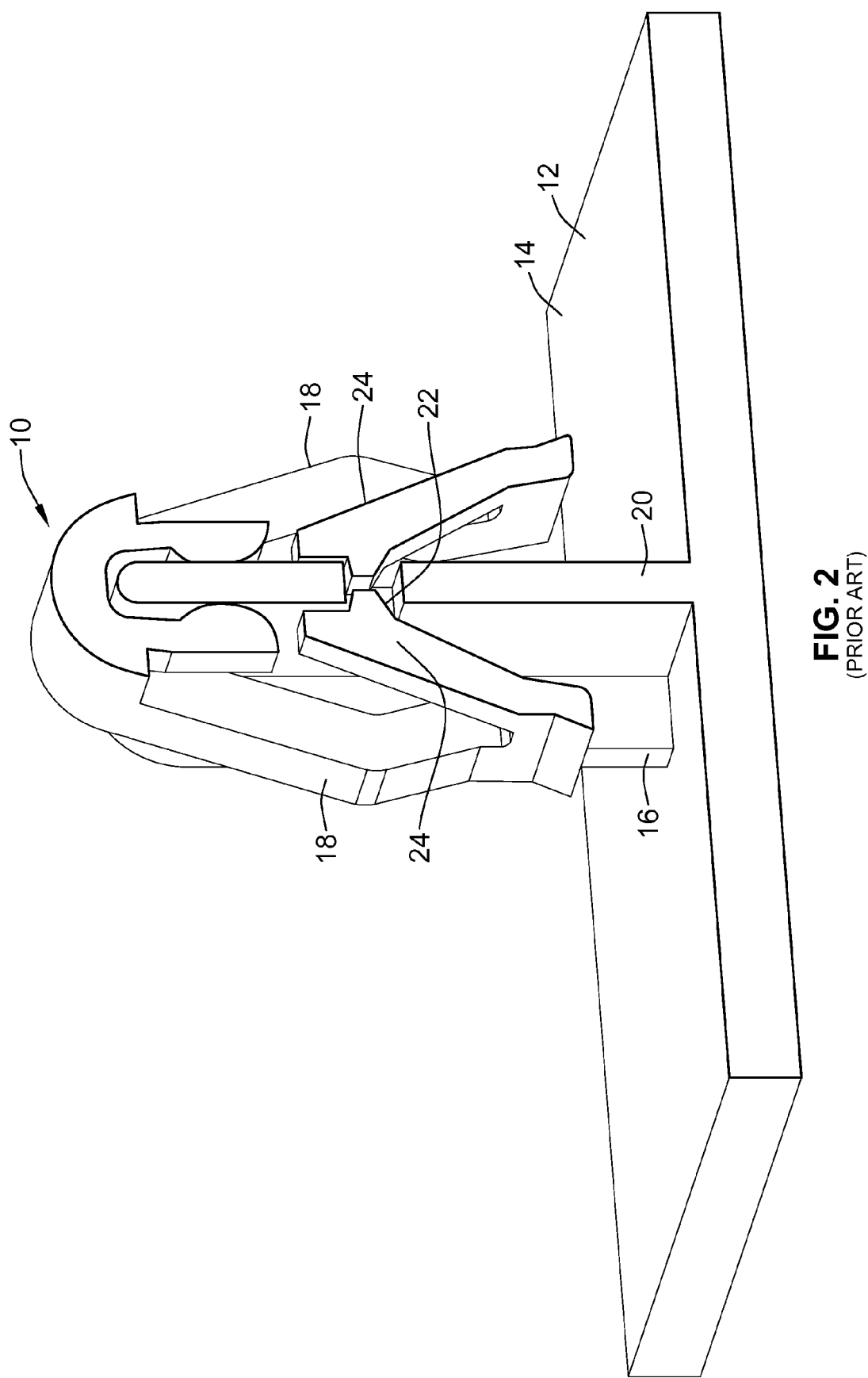
FIG. 2 illustrates a partial cross-sectional view of a conventional plastic clip secured to a mounting stud of a trim panel.

As shown and described with respect to FIGS. 2-19, embodiments of the present invention provide a fastening clip assembly that quickly and efficiently secures to a trim panel. Unlike the plastic clip 10 shown in FIGS. 1 and 2, the embodiments of the present invention may be quickly and easily secured to a trim panel without the need for expensive side-action tooling.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A fastening clip assembly configured to securely fasten to a mounting stud of a panel, the assembly comprising:
    a main clip comprising: (i) a cylindrical central column defining a central passage, wherein said central column comprises a ledge, and (ii) opposing clipping members on opposite sides of said central column; and
    a tapered locking pin integrally connected to said central column through at least one flash joint integrally connected to said main clip proximate said ledge, wherein said tapered locking pin is configured to move into said central passage in order to securely fasten the assembly to the mounting stud.

2. The assembly of claim 1, wherein said central column has a series of longitudinal ribs extending from an interior surface.

3. The assembly of claim 1, wherein said tapered locking pin comprises an expanded end integrally connected to a tip through a shaft.

4. The assembly of claim 3, wherein said tapered locking pin tapers down from said expanded end to said tip at a constant angle.

5. The assembly of claim 1, wherein said tapered locking pin comprises at least one longitudinal notch extending over a length of said tapered locking pin.

6. The assembly of claim 1, wherein each of said clipping members comprises opposing flexible legs having ramped apexes, and wherein said clipping members are configured to snapably secure to an attachment.

7. The assembly of claim 1, wherein said central passage comprises an opening proximate said ledge that has a smaller diameter than an expanded end of said tapered locking pin.

8. A fastening clip assembly configured to securely fasten to a mounting stud of a panel, the assembly comprising:
    opposing clipping members integrally connected with a connecting member; and
    a tapered securing beam extending from said connecting member between said opposing clipping members, wherein said tapered securing beam comprises an expanded end connected to a distal tip through a tapering shaft, and wherein said expanded end integrally and fixedly connects to said connecting member.

9. The assembly of claim 8, wherein said connecting member comprises a rounded nub.

10. The assembly of claim 8, wherein said tapered connecting beam tapers down from said expanded end to said distal tip at a constant angle.

11. The assembly of claim 8, wherein each of said opposing clipping members comprises opposing flexible legs having ramped apexes, and wherein said clipping members are configured to snapably secure to an attachment.

12. An assembly comprising:
    a trim panel comprising a mounting stud; and
    a fastening clip sub-assembly configured to securely fasten to a mounting stud of a panel, said fastening clip sub-assembly comprising:
        a main clip comprising a cylindrical central column defining a central passage, wherein said central column comprises a ledge, wherein said main clip comprises opposing clipping members on opposite sides of said central column; and
        a tapered locking pin integrally connected to said central column through at least one flash joint integrally connected to said main clip proximate said ledge, wherein said tapered locking pin comprises an expanded end integrally connected to a tip through a shaft, and wherein said tapered locking pin is configured to move into said central passage in order to securely fasten said fastening clip sub-assembly to said mounting stud.

13. The assembly of claim 12, wherein said central column has a series of longitudinal ribs extending from an interior surface.

14. The assembly of claim 12, wherein said tapered locking pin tapers down from said expanded end to said tip at a constant angle.

15. The assembly of claim 12, wherein said tapered locking pin comprises at least one longitudinal notch extending over a length of said tapered locking pin.

16. The assembly of claim 12, wherein each of said clipping members comprises opposing flexible legs having ramped apexes, and wherein said clipping members are configured to snapably secure to an attachment.

17. The assembly of claim 12, wherein said central passage comprises an opening proximate said ledge that has a smaller diameter than said expanded end of said tapered locking pin.

18. The assembly of claim 12, wherein said mounting stud comprises a plurality of petal beams defining an interior passage therebetween, and wherein adjacent petal beams are separated by channels, said channels receive and retain interior ribs extending within said central column.

19. The assembly of claim 12, wherein said locking pin is configured to be urged into said interior passage and spread said petal members outwardly into interior surfaces of said central column such that said petal members are compressively sandwiched between said locking pin and said central column, thereby securely fastening said fastening clip subassembly to said trim panel.

20. The assembly of claim 1, wherein each of the opposing clipping members integrally connects about the central column through a curved anchoring flexible joint.

* * * * *